United States Patent [19]

Donaldson

[11] 3,972,540
[45] Aug. 3, 1976

[54] ANTI-LOAD STRIPPING AND SAFETY ATTACHMENT FOR LOGGING TRUCK-TRAILER COMBINATIONS

[76] Inventor: Jack D. Donaldson, 134 Beville Road, Chehalis, Wash. 98532

[22] Filed: Aug. 18, 1975

[21] Appl. No.: 605,280

[52] U.S. Cl. ............................. 280/404; 280/426; 188/129
[51] Int. Cl.[2] ........................................ B62D 53/00
[58] Field of Search ........... 280/404, 426, 432, 482, 280/478 A; 188/129, 67

[56] References Cited
UNITED STATES PATENTS

| | | | |
|---|---|---|---|
| 1,436,025 | 11/1922 | Falco | 280/404 X |
| 2,809,721 | 10/1957 | Knights | 188/67 |
| 3,591,200 | 7/1971 | VanRaden | 280/404 X |
| 3,881,748 | 5/1975 | Donaldson | 280/404 |

*Primary Examiner*—M. H. Wood, Jr.
*Assistant Examiner*—R. Schrecengost
*Attorney, Agent, or Firm*—Eugene D. Farley

[57] ABSTRACT

An attachment for logging truck-trailer combinations which have a trailer reach and sliding compensation means allowing the trailer to move freely longitudinally in relation to the truck, acts to prevent separation of the truck and trailer, and hence stripping of the load therefrom, under highway upgrade or mire conditions. The attachment comprises expanding friction brake means configured to fit within the trailer reach and connecting means to join the expanding friction brake means to the sliding compensation means. Positioning means positions the expanding friction brake means for releasable, frictional, braking contact with the inner walls of the trailer reach and brake operating means allow the operator remotely to activate the attachment to prevent separation of the truck and trailer when conditions tending to cause such separation are encountered.

14 Claims, 8 Drawing Figures

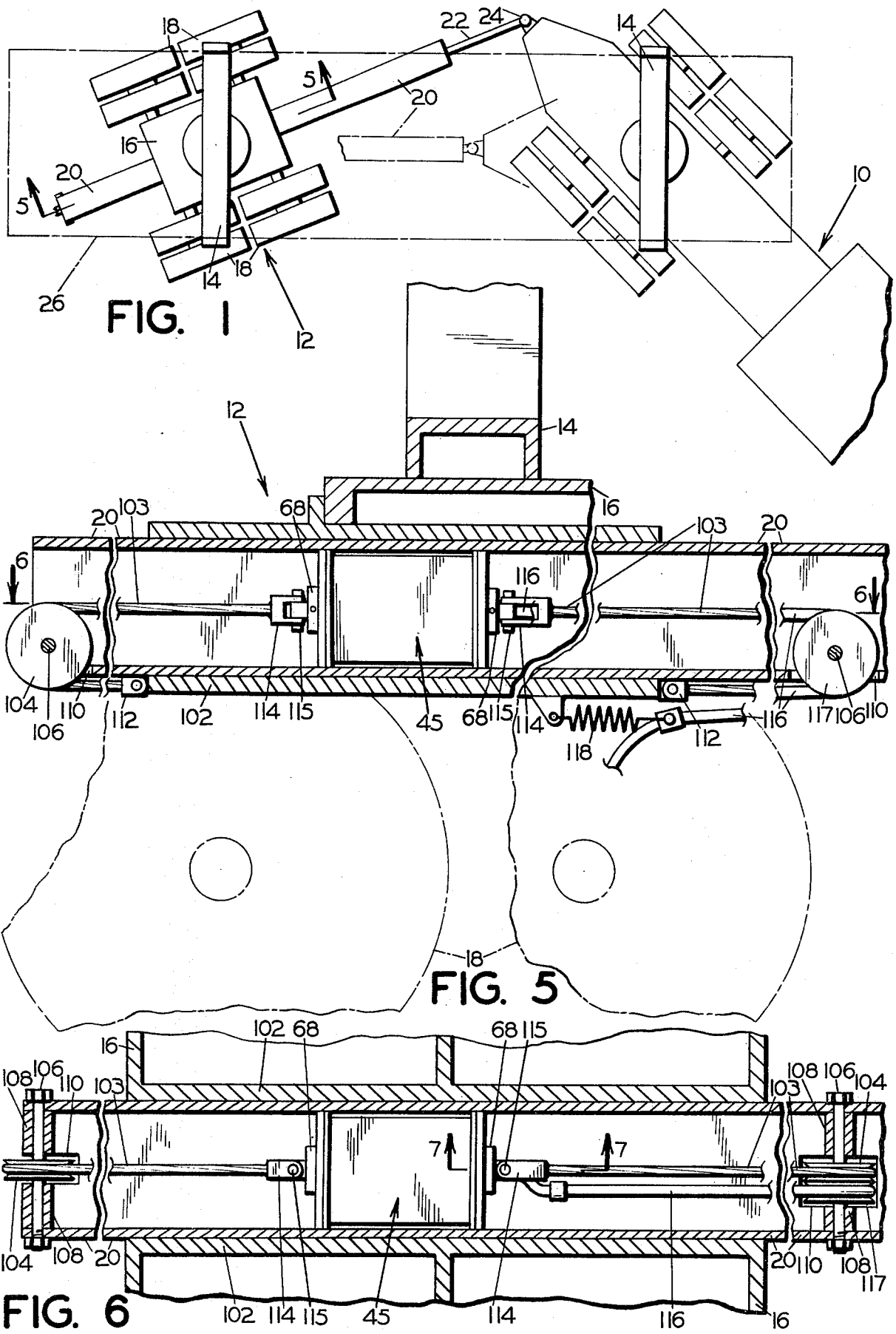

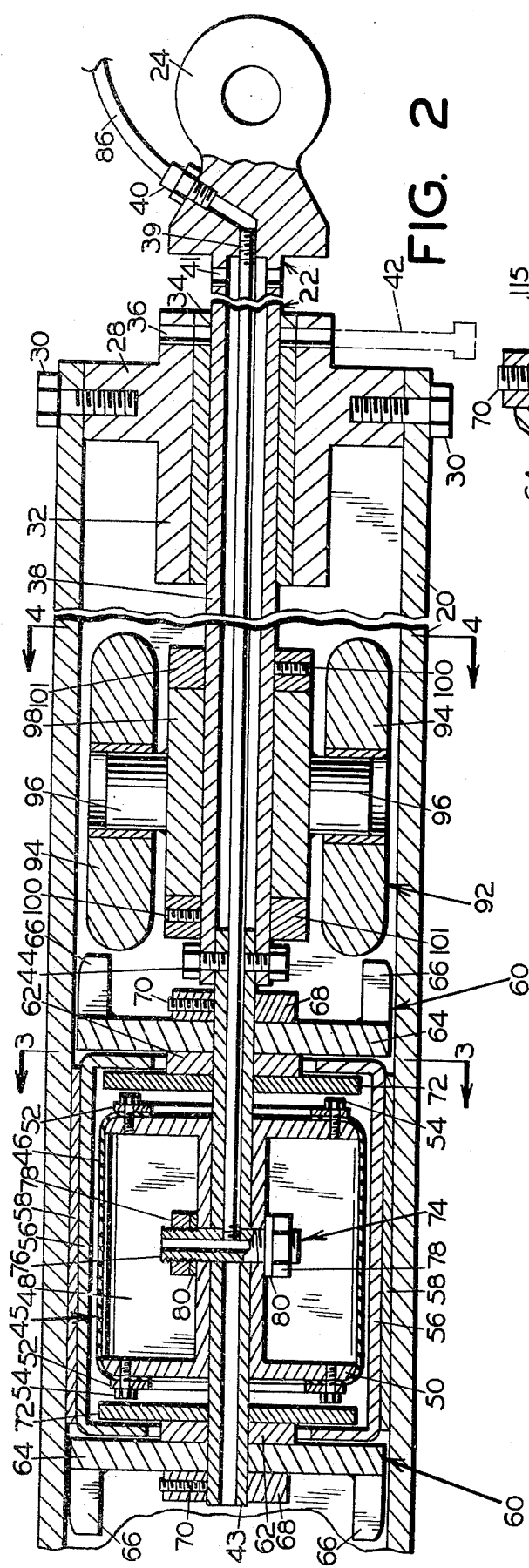

ANTI-LOAD STRIPPING AND SAFETY ATTACHMENT FOR LOGGING TRUCK-TRAILER COMBINATIONS

BACKGROUND OF THE INVENTION

This invention relates to logging truck-trailer combinations. It pertains particularly to an anti-load stripping and safety attachment for preventing the separation of the truck and trailer and consequent dumping of the load under heavy travel conditions.

The conventional logging truck-trailer combination comprises truck and trailer units, each mounting a transverse log bunk. The trailer is provided with a reach or tongue of substantial length. The forward end of the reach is coupled pivotably and releasably to the rearward end of the truck frame.

Because of the character of the load, which consists of logs many feet in length, supported at one end on the forward bunk and at the other end on the rearward bunk, a particular operational problem is encountered.

If the trailer reach is coupled pivotably in a fixed relation to the truck frame, it is impossible to turn a corner with a truck-trailer combination. Because of the inflexible character and great length of the logs, turning the front wheels of the truck has no steering effect whatsoever. The forward driving momentum of the load continues to drive the truck forwardly, even though the steering wheels are turned at an angle, with the front wheels skidding sideways along the road.

To overcome this problem, it is conventional practice to equip the trailer reach with sliding compensation means which allows the trailer to move freely longitudinally in relation to the truck. The present attachment is shown with two different types of sliding compensation means. In the first, a compensator shaft, which telescopes into the reach, is utilized. The outer end of the compensator shaft is connected to the rearward end of the truck.

The second type of sliding compensation means utilizes a bushing positioned longitudinally in the trailer frame to allow the reach to fit slideably therein.

In both situations, when the truck tows the trailer in an empty condition, the sliding compensation means is fixed to form a towing connection. However, when the truck tows the trailer in a loaded condition, the sliding compensation means is unfixed. The pulling force of the truck, then, is transmitted to the trailer through the logs themselves rather than through the trailer reach and its connection to the truck frame.

This leaves the sliding compensation means freely sliding so that the relative longitudinal adjustment between the truck and trailer may be made as required to make possible steering the truck around corners.

The use of sliding compensation means in this manner is a highly successful expedient in overcoming the above described problems, however, it is attended by serious disadvantages.

One of these is the time consuming and dangerous act required to couple and uncouple the truck and trailer. Under present conditions it is required that the driver or another employee get under the vehicle, which may be loaded with logs, to remove a coupling pin or release a clamp to uncouple a compensator shaft preliminary to traveling, or to couple it preliminary to unloading. This obviously exposes the person concerned to a severe hazard.

Also, when the trailer unit is subjected to a heavy drag, as it is when the trailer wheels are mired down in soft ground, or when the combination ascends a steep grade, the weight of the logs bearing on the bunks which supports them is insufficient to maintain the connection between truck and trailer. As a consequence, the ends of the logs slip off of one of the bunks and are dumped on the roadway. This is particularly true when short logs, which overhang the bunk by a few inches, are being carried. The labor required to clear the road, recouple the trailer to the truck, and reload the logs is self evident.

Anti-load stripping attachments heretofore have been known to prevent these problems. One such attachment is disclosed in my prior patent, U.S. Pat. No. 3,881,748. These prior attachments, however, have provided braking means separate from the sliding compensation means rather than braking means which act directly on the sliding compensation means. Therefore, the prior art attachments have not provided a positive brake and are not adaptable to all types of sliding compensation means.

It accordingly is the general purpose of the present invention to provide an improved anti-load stripping and safety attachment which prevents separation of the trailer from the truck in a logging truck-trailer combination under conditions of heavy load drag, as well as when coupling and uncoupling the compensation means, as above described.

It is a further object of the present invention to provide such an attachment having positive brake means.

It is a further object of the present invention to provide such an attachment that can be adapted for several forms of sliding compensation devices.

THE DRAWINGS

The manner in which the foregoing and other objects of the invention are accomplished will be apparent from the accompanying specification and claims considered together with the drawings wherein:

FIG. 1 is a fragmentary plan view of a logging truck-trailer combination provided with the anti-load stripping and safety attachment of my invention;

FIG. 2. is a fragmentary horizontal view, in section, showing the installation of the attachment in a first embodiment;

FIG. 3 is a transverse sectional view, partially broken away, taken along the line 3—3 of FIG. 2;

FIG. 4 is a transverse sectional view, partially broken away, taken along the line 4—4 of FIG. 2;

FIG. 5 is a fragmentary, longitudinal, sectional view taken along the line 5—5 of FIG. 1, showing the installation of the attachment of my invention in a second embodiment;

FIG. 6 is a fragmentary, horizontal, sectional view taken along the line 6—6 of FIG. 5;

FIG. 7 is a fragmentary, detailed, sectional view, taken along the line 7—7 of FIG. 6; and FIG. 8 is a schematic showing the brake operating means of the present attachment.

GENERAL STATEMENT OF THE INVENTION

The present invention generally provides an anti-load stripping and safety attachment for logging truck-trailer combinations which have a trailer reach and sliding compensation means freely movable with respect to the trailer reach to allow longitudinal movement of the trailer relative to the truck, making possible steering of the truck around corners.

The attachment comprises expanding friction brake means, which is configured to fit within the trailer reach, and positioning means to position the expanding friction brake means for releasable frictional braking contact with the inner walls of the trailer reach. Brake operating means allows remote operation of the expanding friction brake means when necessary to prevent separation of the truck and trailer.

Connecting means connects the expanding friction brake means to the sliding compensation means.

DETAILED DESCRIPTION OF PREFERRED EMBODIMENTS

In the embodiment of the invention shown in FIGS. 2, 3, and 4, the attachment is utilized with a compensator shaft that telescopes in freely sliding relation into the trailer reach; in that of FIGS. 5, 6 and 7 it is utilized with a trailer reach that is slideably carried in a bushing positioned in the trailer. Considering first the former:

The attachment is utilized on a log truck-trailer combination, as shown in FIG. 1, comprising truck 10 and trailer 12, each having pivotably mounted thereon log bunk 14. The trailer comprises trailer frame 16, wheels 18, and trailer reach 20. Sliding compensation means, freely movable with respect the trailer reach, allows the trailer to move freely longitudinally in relation to the truck. In this embodiment the sliding compensation means comprises compensator shaft 22 freely telescoping within the trailer reach and coupled to the truck by coupling 24. The log load 26, shown by the dashed lines, is held on the bunks by gravity.

The trailer reach normally comprises a hollow box frame open at both ends. In this embodiment the trailer reach is joined to the trailer by attachment means (not shown) which permits variable positioning of the trailer along the extent of the trailer reach to accommodate the various load lengths.

Head piece 28 fits within the forward portion of the trailer and is fastened therein by bolts 30, FIG. 2. The head piece includes centrally located sleeve 32 on its inner portion, which carries compensator shaft bearing 34. Pin hole 36 runs through the front portion of sleeve 32, compensator shaft bearing 34, and compensator shaft 22.

Compensator shaft 22 comprises an elongate cylindrical tube 38 mounted for sliding longitudinal movement in compensator shaft bearing 34 of the head piece. The central portion of the compensator shaft contains tube 39 to transmit compressed air to operate the attachment. Tube 39 communicates through fitting 40 in coupling 24 to a truck-located compressed air source.

The forward end of the elongate cylindrical tube contains hole 41 which aligns with pin hole 36 of the head piece when the compensator is fully inserted into the trailer reach.

Pin 42 removably inserts into pin hole 36 and hole 41 to fix the compensator shaft in relation to the trailer reach to allow a towing connection between the truck and trailer. When the pin is removed, as it is when the combination is loaded with logs, limited relative longitudinal movement of truck and trailer is permitted as required to make possible steering the assembly.

It is the function of the present attachment to prevent inadvertent separation of the truck and trailer, thus dumping the load of logs when the combination encounters adverse road conditions.

Referring now to FIG. 2, the attachment comprises connecting means, such as support shaft 43, which serves as an extension of compensator shaft 22. Support shaft 43 is of a diameter to fit within the compensator shaft and is joined thereto by attachment means, such as bolts 44.

Expanding friction brake means 45 is configured to fit onto support shaft 43 and be inserted into the trailer reach. The expanding friction brake means comprises an air-operated resilient diaphragm 46 operated by compressed air supplied from the truck. Preferably a common resilient diaphragm, having a portion opposite each internal side wall of the trailer reach, is utilized. A central air chamber 48 then serves the common resilient diaphragm.

The resilient diaphragm is mounted on spool 50 which comprises a cylindrical center portion with substantially normal flanges at each end. Rings 52 join to spool 50 by means of screws 54 thus clamping the resilient diaphragm therebetween. The spool includes a central longitudinal opening dimensioned to fit over the support shaft, centering the resilient diaphragm within the trailer reach.

Brake shoes 56, having a planar, rectangular portion and inwardly extending tabs on two opposed ends, are placed over the diaphragm; one adjacent each inner wall of the trailer reach. Brake linings 58 are bonded on the outer surfaces of the brake shoes to contact the inner walls of the trailer reach when activated. The brake shoes do not rigidly attach to any other parts, but are freely floating between resilient diaphragm 46 and trailer reach 20. Positioning means 60 positions the brake shoes for releasable frictional braking contact with the inner walls of the trailer reach.

Positioning means 60 comprises intermediate spacer rings 62 configured to fit slideably on the support shaft inwardly adjacent the inwardly extending tabs of brake shoes 56. A slight gap is present between the brake shoes and the intermediate spacer rings during normal operation of the expanding friction brake means. However, the intermediate spacer rings are configured to prevent the brake shoes from contacting spool 50 and damaging the resilient diaphram if the brake shoes are forced inwardly.

Outer shoe retaining plates 64 include flat plates substantially the same size as the cross-section of the trailer reach with medial openings to fit slideably over the support shaft. Outwardly extending tabs 66 are joined to the outer shoe retaining plates at each corner to aid in inserting and aligning the attachment in the trailer reach.

Outer lock rings 68 fit on the support shaft outwardly adjacent the outer shoe retaining plates and are clamped to the support shaft by set screws 70. The outer lock rings 68 thus define the outer limits of the sliding engagement of the expanding friction brake means on the support shaft.

Inner shoe retaining plates 72 slideably fit on the support shaft inwardly adjacent the intermediate spacer rings.

The expanding friction brake means is joined to the support shaft by bolt means 74. Bolt means 74 comprises hollow threaded rod 76 with a medial opening aligned to communicate with tube 39. Tube 39, which is contained within compensator shaft 22 and support shaft 43, allows compressed air to be supplied through the hollow threaded rod into central air chamber 48 of the resilient diaphragm. Nuts 78 and washers 80 fit on both ends of the threaded rod to form an air tight chamber 48 and to fix the expanding friction brake means relative the support shaft and thus the compensator shaft.

Brake operating means 82, shown in FIG. 8, allows remote activation of the expanding friction brake means of the present attachment. A compressed air source 84, located on the truck, provides compressed air to tube 86. Normally open air valve 88 placed in tube 86 may be activated by air valve 90 to supply compressed air to the brake unit when desired, thus locking the compensator shaft, FIG. 2, or trailer itself, as in FIGS. 5 and 6, to the trailer reach to prevent stripping of the log load or to facilitate the towing of the trailer when the vehicle is not loaded with logs.

Rolling support means 92 is placed on the compensator shaft adjacent the attachment to center it in the trailer reach, thus protecting the attachment from large side loading and reducing wear of the compensator shaft in the compensator shaft bearing, and excessive wear on brake unit assembly 45. Thus rolling support means 92 (the wheel assembly) supports the load and thrust that otherwise would be exerted on brake unit plates 60 and tabs 66. The rolling support means comprises wheels 94 of a diameter substantially equal to the vertical inside dimension of the trailer reach. Two such wheels are preferably provided and rotatably carried on the end of opposed axles 96. Support frame 98 joins the axles rigidly to the trailer reach by means of collars 101 and set screws 100.

In the form of the invention, illustrated in FIGS. 5, 6, and 7, the same expanding friction brake means hereinbefore described is utilized, but it is adapted for use with different sliding compensation means. In this form the sliding compensation means comprises bushing 102 which comprises that portion of trailer frame 16 which normally is joined to the reach. The bushing is configured to allow trailer reach 20 to slide freely therein. Rather than using a compensator shaft, the forward portion of the trailer reach is coupled directly to the truck.

Cables 103 extend from joinder to each end of the expanding friction brake means, forwardly and rearwardly respectively, to joinder with the trailer frame. Preferably the forward cable extends forwardly past the forward end portion of the trailer frame, and the rearward cable extends rearwardly past the rearward end portion of the trailer frame. Cable pulleys 104 are rotatably mounted substantially in the transverse center of the trailer reach on shafts 106. Bushings 108 placed on the shafts maintain the cable pulleys in their centered position.

The lower portions of the cable pulleys extend through slots 110 located in the lower surface of the reach. The cables, then, reversely bend around the cable pulleys to run back toward the expanding friction brake means before joinder to the trailer frame at connectors 112.

The cables are attached to the expanding friction brake means by clevises 114. As illustrated in FIG. 7, clevises 114 are joined to support shaft 43 at its ends outwardly adjacent the outer lock rings by bolts 115.

Flexible air supply tube 116 extends from the rear of support shaft 43 around the side of the rear clevis. Tube pulley 117, mounted coaxially beside the rear cable pulley, allows for reversely bending the flexible air supply tube so that it may run forwardly outside the trailer reach to a compressed air source located in the truck. The air supply tube is anchored to the rear portion of the trailer frame by spring 118.

The reason for routing the flexible air supply tube rearwardly in the trailer reach is two-fold. Firstly, since the double pulleys require a larger slot to be placed in the trailer reach, it is advantageous to place the double pulleys at the location least vulnerable to breakage. Secondly, by routing the flexible air supply tube rearwardly and anchoring it to the trailer frame by spring 118, the air supply tube remains stationary with respect to the trailer during translation of the reach.

OPERATION

In the operation of both forms of the invention, the truck and trailer combination is moved to the log loading site, customarily with the trailer separated from the truck and riding on it piggy-back. At the loading site, the trailer is unloaded from the truck and coupled to it.

If the trailer must be towed prior to the loading of the logs, the sliding compensation means must be fixed, as by pin 42. In the embodiment shown in FIGS. 2, 3, and 4, pin 42 may be inserted into pin hole 36 and hole 41 fixing the trailer reach relative the compensator shaft and thus the truck. In the embodiment shown in FIGS. 5, 6, and 7, screw clamp fixing means (not shown) fix the trailer relative the reach and thus the truck.

After the logs have been loaded on the bunks, the anti-sliding compensation means must be unfixed, allowing the trailer to move freely relative to the truck. The towing force, then, is transferred to the trailer through the logs which bridge and couple the truck and trailer. The necessary adjustment of position between truck and trailer can be made as the combination negotiates curves.

In the event a situation is presented which might result in undue separation force between the truck and trailer, dragging the logs off one of the bunks and dumping them, as might occur on a steep grade or soft terrain which mires the trailer wheels, the above described attachment is employed, whereby air is temporarily applied to the braking unit.

In both embodiments, the operator operates the attachment by opening air valve 90 to supply compressed air to central air chamber 48 of resilient diaphragm 46. The diaphragm expands, forcing brake shoes 56 outwardly placing brake lining 58 in contact with the inner walls of trailer reach 20. A temporary connection or coupling between the truck and trailer thus is obtained.

In the embodiment of FIGS. 2, 3, and 4 the connection is obtained via trailer frame 16, trailer reach 20 which is joined thereto, expanding friction brake means 45, support shaft 43, compensator shaft 22, and coupling 24 which is coupled to the truck.

In the embodiment of FIGS. 5, 6, and 7, the connection is made via the forward and rearward edges of the trailer frame, connectors 112, cables 103, clevises 114, expanding friction brake means 45, and trailer reach 20. It will be noted in this embodiment as the reach translates in bushing 102, the expanding friction brake means, which is attached at both ends to the trailer frame, necessarily remains fixed in relation to the trailer and translates in the trailer reach. When activated, the expanding friction brake means engages the reach, fixing it relative to the trailer.

In both cases, relative longitudinal movement of the truck is prevented, as is stripping of the logs from the truck.

After the danger area has been passed, the attachment is deactivated so that the sliding compensation means is free to make the necessary adjustments enabling proper steering of the truck-trailer combination.

Having thus described my invention in preferred embodiments, I claim:

1. An anti-load stripping and safety attachment for logging truck-trailer combinations, provided with a trailer reach, and sliding compensation means freely movable with respect to the trailer reach allowing the trailer to move freely longitudinally in relation to the truck, the attachment comprising;
   A. expanding friction brake means configured to fit within the trailer reach,
   B. positioning means locating the expanding friciton brake means for releasable, frictional, braking contact with the inner walls of the trailer reach,
   C. connecting means joining the expanding friction brake means to the sliding compensation means, and
   D. brake operating means connected to the expanding friction brake means for operation thereof and operable from a remote station.

2. The attachment of claim 1 wherein the expanding friction brake means comprises compressed air operated resilient diaphragm mounted brake shoes.

3. The attachment of claim 2 distinguished by four such brake shoes, one positioned frictionally to engage each inner wall of the trailer reach and mounted on a common air operated resilient diaphragm.

4. The attachment of claim 1 wherein the connecting means comprises a support shaft joined to the expanding friction brake means by bolt means.

5. The attachment of claim 4 wherein the support shaft contains a supply tube to supply compressed air to operate the expanding friction brake means, and the bolt means comprises;
   A. a hollow threaded rod,
   B. medial openings in the hollow threaded rod aligned to communicate with the supply tube, and
   C. nuts and washers communicating with each end of the hollow threaded rod to fix the expanding friction brake means relative to the support shaft.

6. The attachment of claim 1 wherein the positioning means comprises inner shoe retainer plates, outer shoe retainer plates, intermediate spacer rings, and outer lock rings all carried on the support shaft at each end of the expanding friction brake means.

7. The attachment of claim 1 wherein the sliding compensation means comprises a compensator shaft telescoping in freely sliding relation into the trailer reach, coupled to the truck on one end, and joined to the support shaft on the other end.

8. The attachment of claim 7 with rolling support means adjacent the attachment and carrying the compensator shaft substantially centered in the trailer reach.

9. The attachment of claim 1 wherein the sliding compensation means comprises a bushing carried by the trailer slideably to contain the trailer reach.

10. The attachment of claim 9 wherein the connecting means comprises cables extending from joinder at each end of the expanding friction brake means to joinder with the trailer.

11. The attachment of claim 10 wherein the cables extend inside the reach to a point beyond the ends of the trailer, thence over pulleys mounted within the trailer reach and positioned partially through openings in trailer reach, to joinder with the trailer.

12. An anti-load stripping and safety attachment for logging truck-trailer combinations provided with a trailer reach, rectangular in cross-section, and a compensator shaft coupled to the truck and telescoping in freely sliding relation into the truck reach allowing the trailer to move freely longitudinally in relation to the truck, the attachment comprising;
   A. expanding friction brake means configured to fit within the trailer reach, comprising four compressed air operated resilient diaphram mounted brake shoes, one positioned to frictionally engage each inner wall of the trailer reach and mounted on a common air operated resilient diaphragm,
   B. positioning means locating the expanding friction brake means for releasable, frictional, braking contact with the inner walls of the trailer reach, the positioning means comprising inner shoe retainer plates, outer shoe retainer plates, intermediate spacer rings and outer lock rings all carried on the support shaft at each end of the expanding friction brake means,
   C. connecting means joining the expanding friction brake means to the compensator shaft wherein;
      1. the connecting means comprises a support shaft joined to the expanding friction brake means by bolt means,
      2. the support shaft contains a tube to supply compressed air to operate the expanding friction brake means, and
      3. the bolt means comprises,
         a. a threaded hollow rod containing a central passageway therethrough,
         b. medial openings in the threaded rod aligned to communicate with the supply tube, and
         c. nuts and washers communicating with each end of the threaded rod to fix the expanding friction brake means relative to the support shaft.
   D. brake operating means connected to the expanding friction brake means for operation thereof, and operable from a remote station, and
   E. rolling support means adjacent the attachment and carrying the compensator shaft substantially centered in the trailer reach.

13. An anti-load stripping and safety attachment for logging truck-trailer combinations provided with a trailer reach, rectangular in cross-section, slideably contained within a bushing carried by the trailer allowing the trailer to move freely longitudinally in relation to the truck, the attachment comprising;
   A. expanding friction brake means configured to fit within the trailer reach, comprising four compressed air operated resilient diaphragm mounted brake shoes, one positioned frictionally to engage each inner wall of the trailer reach and mounted on a common air operated resilient diaphragm,
   B. positioning means to locate the expanding friction brake means for releasable, frictional, braking contact with the inner walls of the trailer reach, the positioning means comprising inner shoe retainer plates, outer shoe retainer plates, intermediate spacer rings and outer lock rings all carried on the support shaft at each end of the expanding friction brake means, C. connecting means joining the expanding friction brake means to the trailer, the connecting means comprising pulleys mounted within the trailer reach and positioned partially through openings in the trailer reach and cables extending from joinder at each end of the expanding friction brake means, inside the reach to a point beyond the ends of the trailer, thence over the pulleys to joinder with the trailer, and D. brake operating means connected to the expanding friction brake means for operation thereof and operable from a remote station.

14. An anti-load stripping and safety attachment for logging truck-trailer combinations provided with a trailer reach, a compensator shaft coupled to the truck and telescoping in freely sliding relation into the trailer reach allowing the trailer to move freely longitudinally in relation to the truck, expanding friction brake means configured to fit within the trailer reach, and having rolling support means comprising;

A. wheels, of a diameter substantially equal to the vertical inside dimension of the trailer reach, B. an axle rotatably carrying the wheels, and C. a support frame connecting the axle to the compensator shaft.

* * * * *